United States Patent [19]

Yoshida et al.

[11] Patent Number: 5,105,471
[45] Date of Patent: Apr. 14, 1992

[54] APPARATUS FOR CONVERTING CHARACTER OUTLINE DATA INTO DOT DATA, HAVING MEANS FOR CORRECTING REPRODUCTION WIDTH OF STROKES OF ROTATED OR ITALICIZED CHARACTERS

[75] Inventors: Hitoshi Yoshida, Kohnan; Naoyuki Kawamoto, Tajimi; Kazuma Aoki, Kasugai, all of Japan

[73] Assignee: Brother Kogyo Kabushiki Kaisha, Aichi, Japan

[21] Appl. No.: 653,292

[22] Filed: Feb. 11, 1991

[30] Foreign Application Priority Data

Feb. 14, 1990 [JP] Japan ................... 2-33472

[51] Int. Cl.⁵ .............................. G06K 9/48
[52] U.S. Cl. ......................... 382/22; 382/46; 382/48; 382/55
[58] Field of Search ................. 382/55, 46, 24, 48, 382/22, 9; 364/518; 340/724, 723, 739

[56] References Cited

U.S. PATENT DOCUMENTS 4,736,442  4/1988  Kornfeld ................... 382/46
4,845,768  7/1989  Kochert et al. ............ 382/48
4,931,953  4/1988  Uehara et al. ............. 382/55
4,984,284  2/1989  Masaki .................... 382/48

Primary Examiner—Michael Razavi
Attorney, Agent, or Firm—Oliff & Berridge

[57] ABSTRACT

A data converting apparatus for converting outline data of a character into dot data including dot-forming bits each indicative of an image dot to be formed at a position of a corresponding dot-forming picture element which lies within the outline of each stroke of the character, when the character outline is superimposed on a pixel screen wherein picture elements are defined by x-axis and y-axis pixel lines perpendicular to each other. The apparatus includes a device for changing width direction data indicative of a direction of a nominal width of each stroke, if the outline data of the character are subjected to a conversion for rotation or italicization of the character as represented by the converted outline data. The width direction data is changed depending upon the specific condition of the outline data conversion, before at least one of two segments of the character outline which define the width of the stroke is moved in the direction indicated by the width direction data so that the reproduction width of the rotated or italicized character is equal to the nominal width.

12 Claims, 5 Drawing Sheets

FIG. 7
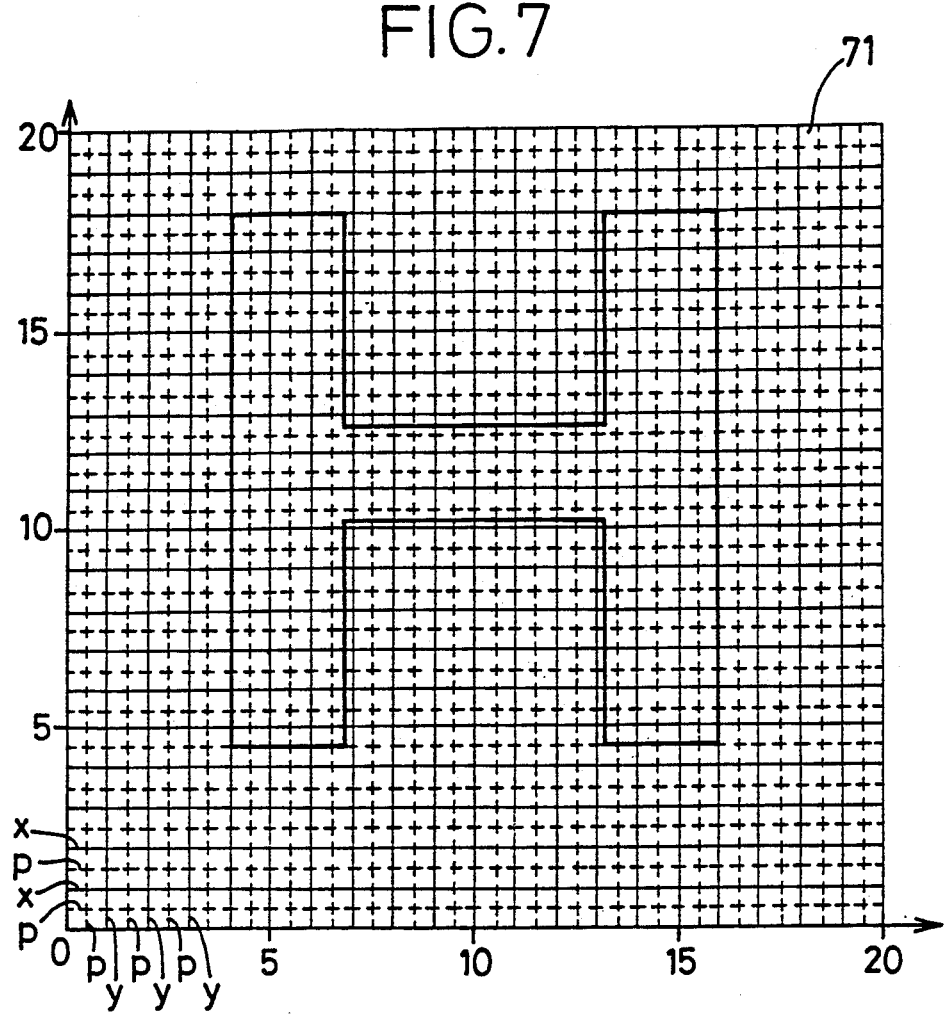
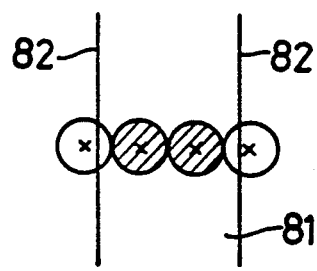
FIG. 8A
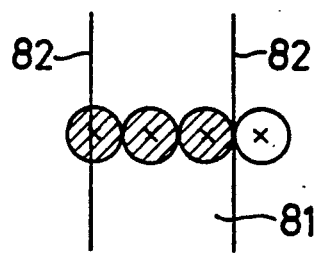
FIG. 8B

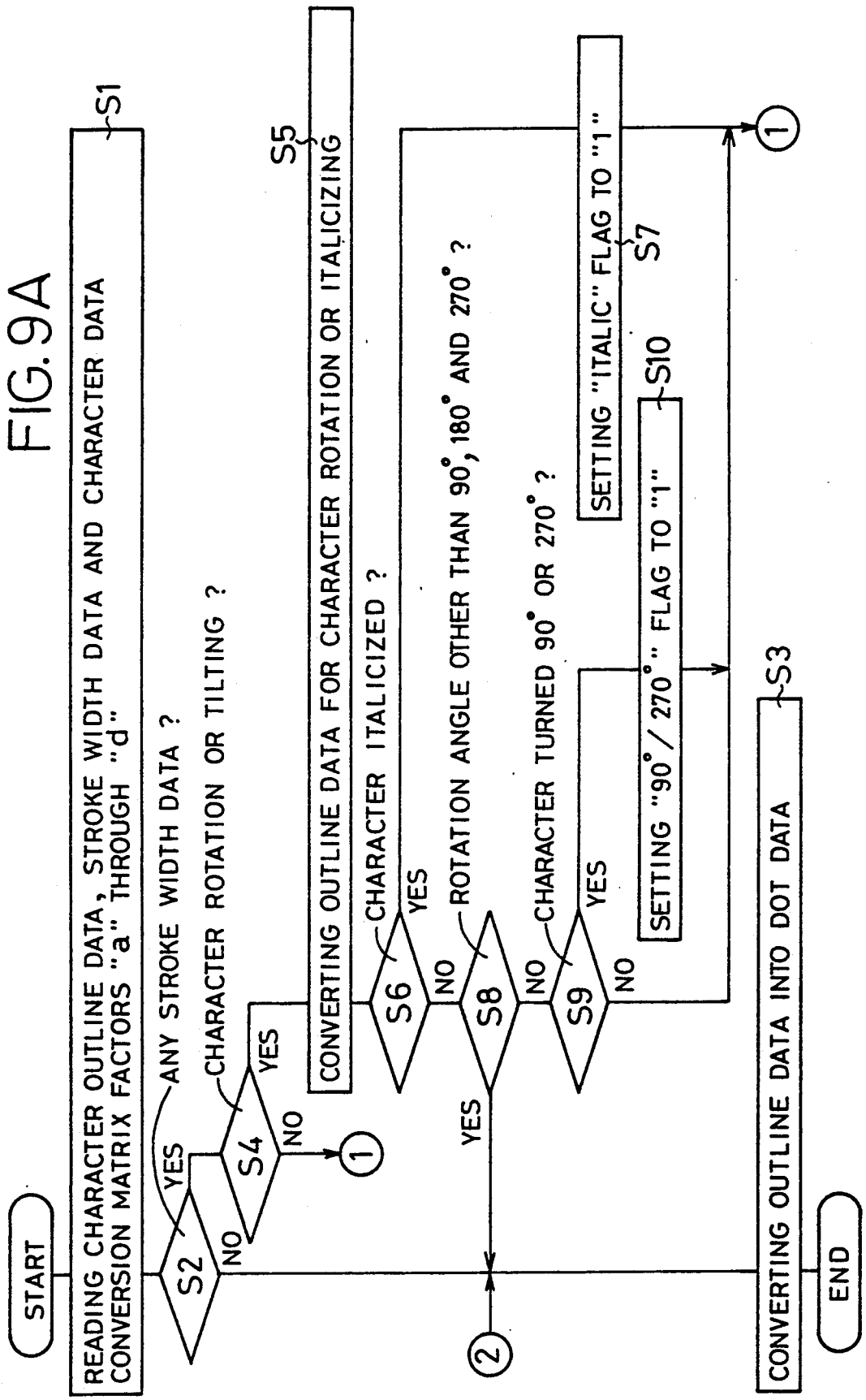

APPARATUS FOR CONVERTING CHARACTER OUTLINE DATA INTO DOT DATA, HAVING MEANS FOR CORRECTING REPRODUCTION WIDTH OF STROKES OF ROTATED OR ITALICIZED CHARACTERS

BACKGROUND OF THE INVENTION

1. Field of the Invention

The present invention relates in general to an apparatus for converting outline data representative of the outlines of characters such as letters and symbols, into dot data indicative of image dots to be formed to reproduce the characters. More particularly, the invention is concerned with a technique for processing the outline data so that the reproduction width of each stroke of the characters is equal to the nominal width.

2. Discussion of the Prior Art

Characters such as letters, numerals and symbols are printed, displayed or otherwise reproduced according to image data suitably processed by a computer. Commonly, the image data take the form of dot data consisting of bits indicative of whether image dots are to be formed at the positions of respective picture elements on a coordinated pixel screen. The dot data are prepared by conversion from outline data representative of the outlines of the characters, such that the dot data include dot-forming bits each indicative of the presence of an image dot to be formed at the position of the corresponding picture element which lies within the outline of each character so as to satisfy a predetermined requirement or condition, when the outline of the character is superimposed on the coordinated pixel screen wherein the picture elements are defined by x-axis pixel lines and y-axis pixel lines perpendicular to the x-axis pixel lines.

To obtain the dot data which assure good appearance of a character, it is desirable to process the outline data so that the width of each stroke of the character reproduced according to the dot data is the same as the nominal width defined by the outline data. The assignee of the present application proposed a data converting apparatus capable of effecting the processing of the outline data for such purpose, as disclosed in U.S. Pat. application, Ser. No. 07/486,225, filed Feb. 28, 1990 and now U.S. Pat. No. 5,050,228. In the data processing apparatus disclosed in the above-identified application, at least one of the two segments of a character stroke outline which define the nominal width of the stroke is moved on the pixel screen in the suitable direction, so that the reproduction width of the stroke is equal to the nominal width.

There will be described in more detail the manner of moving the segments of the character outline, referring to FIG. 2 showing the outline of a character "H" as superimposed on an X-Y coordinated pixel screen, by way of example only.

The character "H" indicated at 20 in FIG. 2 has three strokes 21, 22 and 23, whose reproduction widths are controlled by processing the corresponding outline data. For this purpose, stroke width data memory means is provided to store stroke width data which identify the two strokes 21 and 22 as vertical strokes and the stroke 23 as a horizontal stroke. The stroke width data also specify the nominal widths of the three strokes 21, 22 and 23. If the reproduction widths of the vertical strokes 21, 22 do not coincide with the nominal widths, at least one of the two segments of the outline of the strokes 21, 22 which define the nominal width of the stroke is moved in the x-axis direction. If the reproduction width of the horizontal stroke 23 does not coincide with the nominal width, at least one of the two segments of the outline of the stroke 23 which define the nominal width of the stroke is moved in the y-axis direction. Namely, the outline data of the character "H" are modified so that the reproduction widths of the strokes 21, 22, 23 as defined by the dot data obtained by conversion from the modified outline data are equal to the nominal widths of the strokes as defined by the original outline data.

In some situations, it is required to change the attitude of the characters when they are reproduced. For instance, the character "H" is turned 90° as indicated in FIG. 3, for illustrative purpose. In this case, however, the strokes 21 and 22 of FIG. 2 identified by the stroke width data as the vertical strokes are changed into horizontal strokes 31 and 32, while the stroke 23 of FIG. 2 identified by the stroke width data as the horizontal stroke is changed into a vertical stroke 33. As a result, the movements of the stroke outline segments are effected in the x-axis direction for the horizontal strokes 31, 32, and in the y-axis direction for the vertical stroke 33. In this respect, it is noted that the horizontal strokes 31, 32 have the widths in the y-axis direction, while the vertical stroke 33 has the width in the x-axis direction. Thus, the outline data representative of the 90°-turned character "H" are not processed so as to assure the reproduction width of each stroke equal to the nominal width.

The above drawback is also encountered when the original outline data are processed or converted for italicization of the character, before the outline data for italicization of the character are converted into dot data.

SUMMARY OF THE INVENTION

It is therefore an object of the present invention to provide a data converting apparatus which is capable of processing the outline data, prior to conversion of the outline data into dot data, so that the reproduction width of each stroke of even the rotated or italicized characters is equal to the nominal width, so as to assure good appearance of the characters reproduced in the turned attitude or italic form.

The above object may be accomplished according to the principle of the present invention, which provides a data converting apparatus for converting a batch of outline data representative of an outline of a character having strokes, into a batch of dot data which include dot-forming bits each indicative of the presence of an image dot to be formed at a position of a corresponding dot-forming picture element which lies within the outline of each of the strokes so as to satisfy a predetermined requirement, when the outline of the character is superimposed on a coordinated pixel screen wherein picture elements are defined by a plurality of parallel x-axis pixel lines and a plurality of y-axis pixel lines perpendicular to the x-axis pixel lines, wherein the improvement comprises: (a) stroke width data memory means for storing stroke width data which designate at least one of the strokes of the character and specify a nominal width of each of the at least one of the strokes, and width direction data indicative of a direction of the nominal width of each stroke, the nominal width specifying the width of the stroke which is defined by two segments of the outline of the stroke; (b) width direction data changing means for changing the width direction data if the outline data of the character are subjected to a conversion for one of rotation and italicization of the character as represented by the converted outline data, the width direction data being changed depending upon a condition of the conversion; and (c) outline segment moving means for changing the converted outline data so as to move, in a direction indicated by the changed width direction data, at least one of the two segments of the outline of the stroke, on the coordinated pixel screen, before the converted outline data are converted into the dot data, if the number of the picture elements which lie between the two segments in the direction indicated by the changed width direction data so as to satisfy the predetermined requirement is different from the number of the picture elements which correspond to the nominal width of the stroke. A distance of movement of the at least one of the two segments is determined so that the number of the picture elements which lie between the two segments is equal to the number of the picture elements corresponding to the nominal width.

It is noted that the number of the picture elements which lie within the outline of a stroke of a character as superimposed on the coordinated pixel screen changes if a segment of the stroke outline is moved relative to the pixel screen.

According to the present invention, therefore, if the number of the picture elements which lie between the two segments of the stroke outline defining the nominal width of the stroke as superimposed on the pixel screen is different from the number of the picture elements which corresponds to the nominal width specified by the stroke width data, one or both of the two segments of the stroke outline is/are moved on the pixel screen in the direction indicated by the width direction data, so that the reproduction width of the character stroke represented by the number of the picture elements between the two segments of the stroke outline is equal to the nominal width specified by the stroke width data.

In the case where the original outline data of a character are converted to rotate or italicize the character, the width direction data are changed so that the changed width direction data represent the nominal width of each stroke of the rotated or italicized character, if that nominal width is specified by the stroke width data. Thus, the present data converting apparatus is capable of converting the original outline data into dot data so that the reproduction width of each character stroke whose nominal width is specified by the stroke width data is always the same as the nominal width, even if the original outline data are converted for rotation or italicization of the relevant character before the converted outline data are converted into the dot data. This arrangement assures good appearance of the rotated or italicized characters.

The width direction data changing means may comprise judging means operable, for determining whether it is necessary to activate the outline segment moving means to move one or both of the two segments of the stroke outline before the converted outline data are converted into the dot data. The judging means operates to not only change the width direction data depending upon the condition of the rotation or italicization of the character, but also determine whether it is necessary to activate the outline segment moving means.

The stroke width data may indicate the nominal width of each stroke, in at least one of x-axis and y-axis directions parallel to the x-axis and y-axis pixel lines. In this case, the judging means of the width direction data changing means may be adapted to change the width direction data indicative of at least one of the x-axis and y-axis directions, to the width direction data indicative of the other of the x-axis and y-axis directions, if the conversion of the outline data for rotation of the character causes 90° or 270° rotation of the character.

Generally, the conversion of the outline data for italicization of the character causes a displacement of the character in the x-axis direction parallel to the x-axis pixel lines, by a distance which continuously varies in the y-axis direction parallel to the y-axis pixel lines. In this case, the judging means determines that it is not necessary to activate the outline segment moving means, for each of the strokes of the italicized character which have the nominal width in the x-axis direction, and determines that it is necessary to activate the outline segment moving means, for each of the strokes of the italicized character which have the nominal width in the y-axis direction.

BRIEF DESCRIPTION OF THE DRAWINGS

The above and other objects, features and advantages of the present invention will become more apparent from reading the following detailed description of a presently preferred embodiment of the present invention, when considered in connection with the accompanying drawings, in which:

FIG. 7 is a view illustrating pixel and partition lines on the coordinated pixel screen, and the outline of a character "H" as superposed on the screen;

FIGS. 8A and 8B are illustrations showing two different reproduction widths of a stroke of a character due to different positions of printing of the stroke outline; and FIGS. 9A and 9B are a flow chart illustrating an operation of the data converting apparatus of FIG. 1.

DETAILED DESCRIPTION OF THE PREFERRED EMBODIMENT

Figure 1:
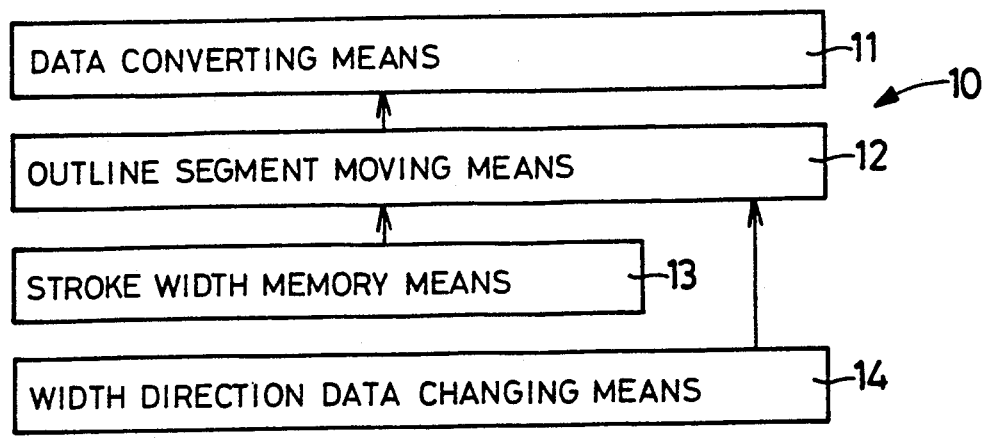
FIG. 1 is a block diagram illustrating one embodiment of a data converting apparatus of the present invention.

Referring first to FIG. 1, the data converting apparatus is indicated generally at 10. The apparatus 10, which is adapted to be used for printing characters, includes data converting means 11 for converting a batch of outline data representative of the outlines of characters, into a batch of dot data indicative of the picture elements at which image dots are formed to reproduce the characters. The data converting apparatus 10 further includes outline segment moving means 12 for changing the outline data so as to move the outlines of the characters as superimposed on a coordinated pixel screen (which will be described), so that the characters to be reproduced according to the dot data have the nominal widths. The apparatus 10 also includes stroke width data memory means 13 and width direction data changing means 14, which are connected to the outline segment moving means 12, so that the moving means 12 is operated according to stroke width data stored in the memory means 13 and width direction data changed by the width direction data changing means, as described later in detail.

When the outline data are converted into the dot data by the data converting means 11, the outline of each character represented by the appropriate outline data is defined in an X-Y coordinate system. While the arithmetic operations to convert the outline data into the dot data are effected in the X-Y coordinate system established in the data converting means 11, this coordinate system is illustrated in FIG. 7 as a coordinated pixel screen 71, for easy understanding of the data conversion. The pixel screen 71 has a multiplicity of picture elements, which are the smallest parts of a picture image to be reproduced according to the dot data. The picture elements are defined by equally spaced-apart x-axis partition lines p parallel to the X axis of the screen 71, and equally spaced-apart y-axis partition lines p parallel to the Y axis of the screen and perpendicular to the X axis. In the present embodiment, the picture elements are square in shape, with two opposite sides of each picture element square defined by the adjacent two x-axis partition lines, and the other two opposite sides of the square defined by the adjacent two y-axis partition lines. In FIG. 7, the partition lines are indicated in dashed lines.

For each of the picture elements on the pixel screen 71, a dot data bit is set to indicate the presence or absence of an image dot. The positions of the picture elements are indicated by x-axis pixel lines x and y-axis pixel lines y which are parallel to the X and Y axes. The pixel lines x and y pass the centers of the picture elements, so that the position of each picture element is represented by x-axis and y-axis coordinate values of the x-axis and y-axis pixel lines x and y passing the center of the picture element. While the picture elements have a square shape in the present embodiment, the picture elements may have a rectangular or other shape.

The pixel screen 71 corresponds to a printing area of a recording medium in which the characters represented by the outline data or dot data are printed. In this respect, it is noted that FIG. 7 shows a portion of the pixel screen 71 in which a character "H" is indicated, by way of example. The x-axis and y-axis pixel lines x and y are identified by the coordinate values. The pixel lines x and y are numbered over the entire area of the screen 71. It will be understood that the picture elements of the characters not shown in FIG. 7 are represented by the x-axis and y-axis pixel lines x, y which are identified by the numbers larger than those indicated in FIG. 7.

When the outline data of a character are converted into dot data, the outline is superimposed on the coordinate pixel screen 71, to determine the picture elements which lie within the outline of the character, so that a dot data bit corresponding to each of the picture elements lying within the character outline is set to "1", which indicates the presence of an image dot to be formed at the corresponding picture element. In the present embodiment, the dot data bit is set to "1" for each picture element whose center is located within the interior of the outline. However, the dot data bit is set to "0" for each picture element which is entirely or at least partially located outside the outline.

A printer operated according to the dot data prepared by the present data converting apparatus 10 is capable of printing the characters in a selected one of different sizes. According to the selected character size, the coordinates of the points defining the outline of the character as superimposed on the pixel screen 71 are converted into the corresponding coordinate values of the dot data which indicate the picture elements at which image dots are printed. On the pixel screen 71, each square picture element is dimensioned as $1 \times 1$ along the X and Y axes. Suppose a character is defined in a $C \times C$ matrix of picture elements (dots) and the coordinates of the outline data for the character are defined in a $1000 \times 1000$ coordinate system, the coordinate values of the character outline on the pixel screen 71 can be calculated by multiplying the coordinate values in the $1000 \times 1000$ coordinate system by C/1000. For example, if a character is defined in a $20 \times 20$ matrix of picture elements as illustrated in FIG. 7, the coordinate value "50" in the $1000 \times 1000$ coordinate system is equal to $(50 \times C/1000) = 50 \times 1/50 = 1$ on the pixel screen 71. Namely, the size of the picture elements (coordinate value "1") on the pixel screen 71 corresponds to the coordinate value "50" in the $1000 \times 1000$ coordinate system for the outline data, if the selected character size requires the characters to be defined in a $20 \times 20$ matrix of dots. The identification numbers designating the pixel lines x and y in FIG. 7 are the coordinate values on the pixel screen 71 where the characters are defined by the $20 \times 20$ matrix of dots (picture elements). When the character outline is superimposed on the pixel screen 71, the coordinate values of the reference point of the character on the screen 71 are determined based on the printing position data which are supplied along with the outline data. According to the determined coordinates of the reference point, the character outline is positioned on the pixel screen 71.

Thus, the position of the outline of a character as superimposed on the pixel screen 71 is influenced by the printing position of the character, as well as by the selected character size. This may cause a problem that the number of the dot-forming picture elements which lie within the outline of the character tends to vary or fluctuate, with variations in the width of a stroke or strokes of the character. Namely, the number of the dot-forming picture elements which lie within the nominal width of the same stroke 21–23 (FIG. 2) defined by the outline as superimposed on the pixel screen 71 may vary depending upon the position of the character outline on the pixel screen 71 and the selected character size. For instance, where a stroke 81 of a character has a nominal width as defined by two segments 82 of the outline of the stroke as indicated in FIGS. 8A and 8B, the number of the dot-forming picture elements (indicated by hatched circles) lying between the two segments 81 is different in the two situations of FIGS. 8A and 8B, because of different relative positions between the stroke outline (82) and the pixel screen (picture elements indicated by the circles). That is, where the nominal width of the stroke 81 corresponds to the two dot-forming picture elements as indicated in FIG. 8A, the reproduction width of the stroke may correspond to the three dot-forming picture elements as indicated in FIG. 8B. The "x" marks within the circles in FIGS. 8A and 8B indicate the centers of the picture elements on the pixel screen 71.

The present data converting apparatus 10 is adapted to check if the reproduction width of a character stroke represented by dot data prepared by conversion from the outline data is the same as the nominal width defined by the two segments of the character outline represented by the outline data. If the reproduction width is different from the nominal width, the outline data are changed so as to move at least one of the two segments of the stroke outline, so that the relevant stroke is reproduced (printed) with the predetermined nominal width.

Figure 9B:
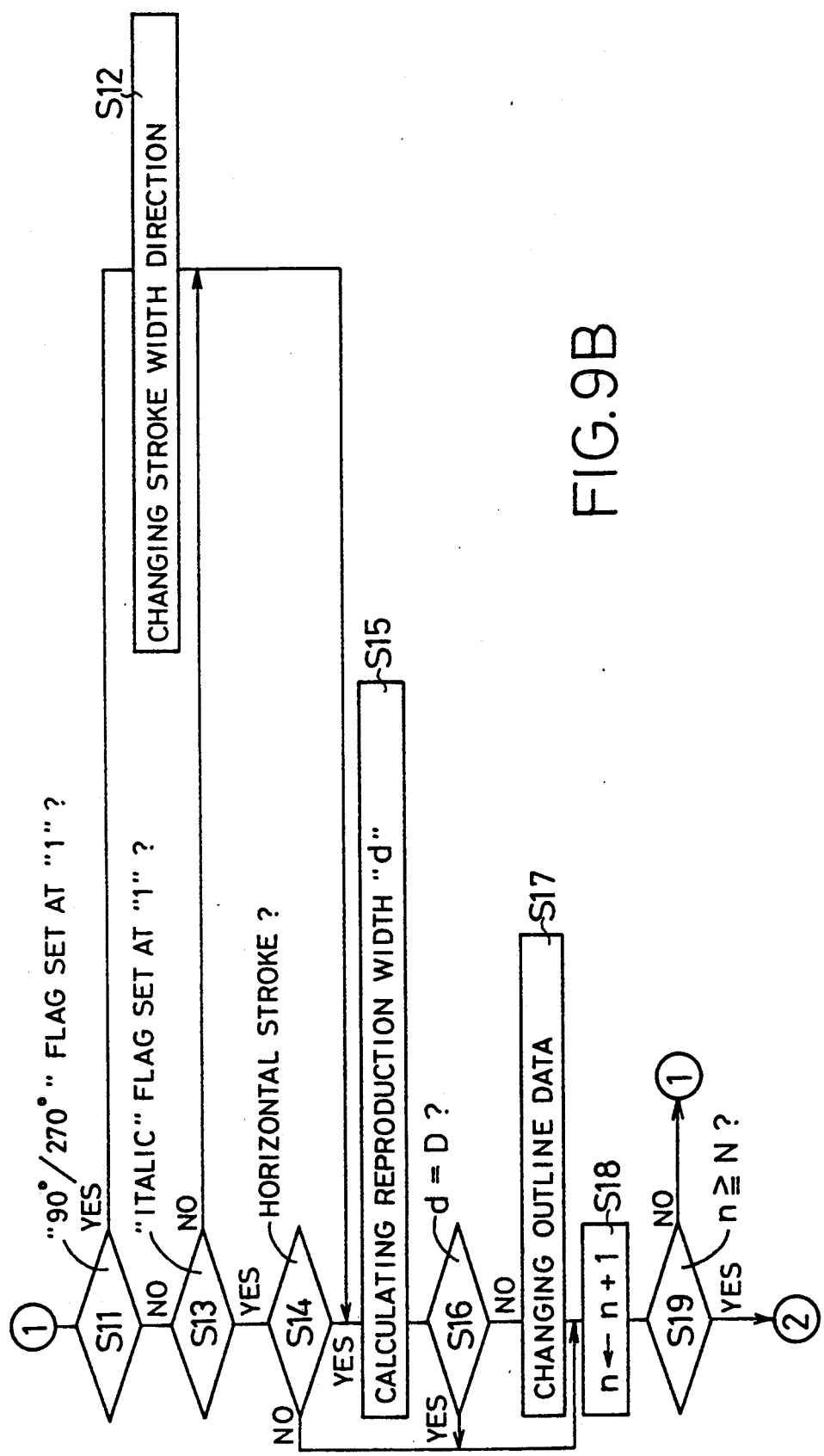

There will be described an operation of the present data converting apparatus 10, referring to the flow chart of FIGS. 9A and 9B which shows the conversion of outline data for letter "H" into corresponding dot data, for illustrative purpose.

Figure 2:
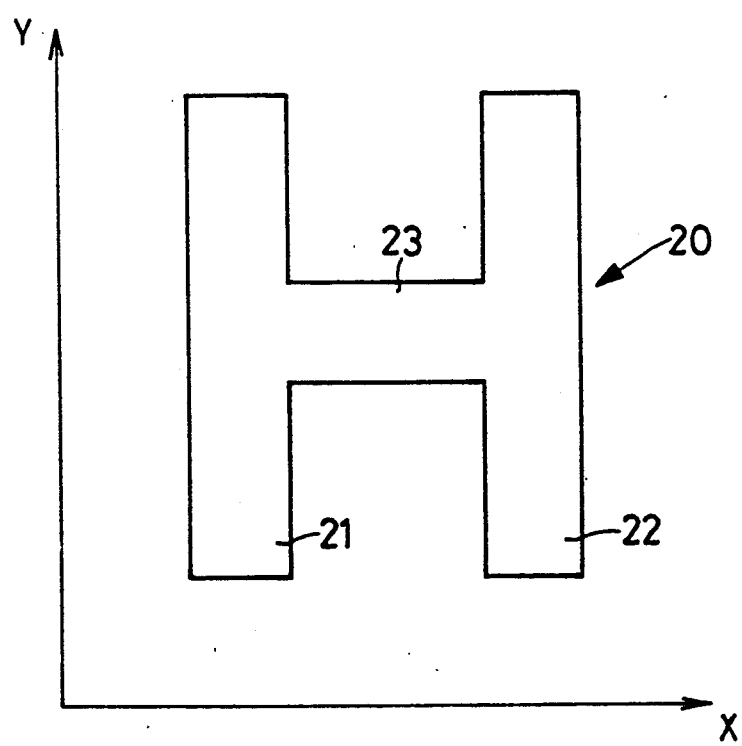
FIG. 2 is a view showing the outline of a character "H" in the normal vertical attitude as superposed on a coordinated pixel screen.

Initially step S1 is executed to read outline data representative of the outline of the character "H", stroke width data which designate the three strokes 21, 22, 23 of the letter "H" and specify the nominal widths of these strokes, and character data conversion matrix factors "a", "b", "c" and "d" which determine the condition in which the outline data are converted for rotating or italicizing the character "H" from the attitude of FIG. 2 to the attitude or form of FIGS. 3-6.

The conversion of the outline data for rotation or italicization of the character "H" can be effected according to the following equations:

$$X1 = aX + bY$$

$$Y1 = cX + dY$$

where, X and Y are x-axis and y-axis coordinate values, respectively, on the pixel screen 71, of each point defining the outline of the character "H" as represented by the original outline data, while X1 and Y1 are x-axis and y-axis coordinate values, respectively, on the same pixel screen 71, of each point defining the outline of the character "H" as represented by the converted outline or changed outline data. When the character "H" is rotated, the conversion matrix factors "a" through "d" are generally expressed as:

$$a = \cos \theta$$

$$b = \sin \theta$$

$$c = -\sin \theta$$

$$d = \cos \theta$$

where, $\theta$: angle of rotation.

Figure 6:
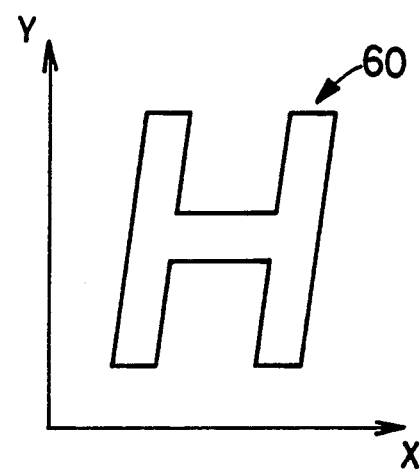
FIG. 6 is a view showing the outline of an italicized character "H"

When the character "H" is italicized as indicated at 60 in FIG. 6, namely, when the character is displaced in the x-axis direction by a distance which continuously varies (increases) in the y-axis direction, as indicated in FIG. 6, the matrix factors "a", "c" and "d" are as follows:

$$a = 1$$

$$c = 0$$

$$d = 1$$

For the italicization, the factor "b" is an arbitrarily selected value. The above equations are formulated for the rotation or italicization without enlargement or contraction of the character.

Step S1 is followed by step S2 to determine whether the stroke width data memory means 13 stores stroke width data which specify the nominal width of any stroke of the character "H". If an affirmative decision (YES) is obtained in step S2, steps S4 through S17 are executed. If there exist no stroke width data stored for the character "H", a negative decision (NO) is obtained in step S2, and the control flow goes to step S3 in which the original outline data for the character "H" are converted into the corresponding dot data. In the present specific example, stroke width data are stored in the memory means 13, for all the strokes which are horizontal or vertical, namely, for all the three strokes 21, 22 and 23 of the character "H", to specify the nominal strokes of these strokes.

Accordingly, step S2 is followed by step S4 to check the conversion matrix factors "a" through "d" read in step S1, to determine whether the outline data for the character "H" are converted for rotation or italicization of the character. A negative decision (NO) is obtained in step S4 if the matrix factors are as follows:

$$a = 1$$

$$b = 0$$

$$c = 0$$

$$d = 1$$

In this case, step S4 is followed by step S11. If the matrix factors "a" through "d" are not as indicated above, step S4 is followed by step S5 in which the original outline data are converted for rotation or italicization according to the matrix factors "a" through "d". Then, the control flow goes to step S6 through S10 to determine the condition of the conversion, more specifically, determine whether the conversion is for the rotation or italicization, and if the conversion is for the rotation, determine the angle of rotation. That is, step S6 is implemented to determine whether the original outline data have been converted for italicization of the character "H". If an affirmative decision (YES) is obtained in step S6, step S7 is implemented to set "ITALIC" flag to "1".

Figure 3:
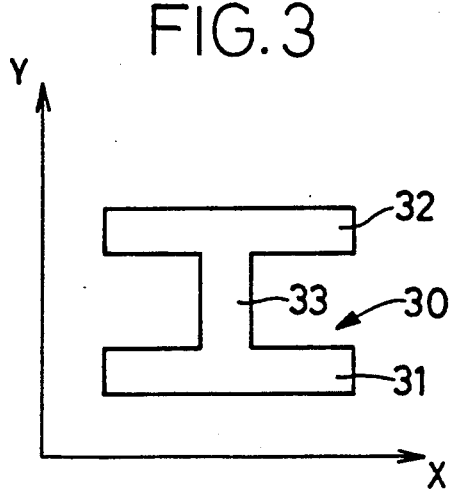
FIG. 3 is a view showing the outline of the character "H" in the 90°-turned or horizontal attitude.

If a negative decision (NO) is obtained in step S6, this indicates that the original outline data have been converted for rotating the character "H". In this case, the control flow goes to step S8 to determine whether the relevant stroke of the rotated character "H" is free from the processing in steps S15-S17 to assure the reproduction width equal to the nominal width. In other words, step S8 is executed to determine whether the stroke of the rotated character "H" is other than a horizontal or vertical stroke which is subject to the processing in steps S15-S17. Therefore, if the angle of rotation of the character "H" is other than 90°, 180° and 270°, an affirmative decision (YES) is obtained in step S8, whereby the control flow goes to step S3, skipping the subsequent steps including steps S15-S17. If a negative decision (NO) is obtained in step S8, this means that the relevant stroke of the rotated character "H" is a horizontal or vertical stroke subject to the processing in steps S15-17, step S8 is followed by step S9 to determine whether the relevant stroke (character "H") has been rotated 90° or 270°. If an affirmative decision (YES) is obtained in step S9, this indicates that the originally vertical stroke (21, 22) has been changed to the horizontal stroke (31, 32 as indicated in FIG. 3) as a result of the 90° or 270° rotation of the original character "H".

Figure 4:
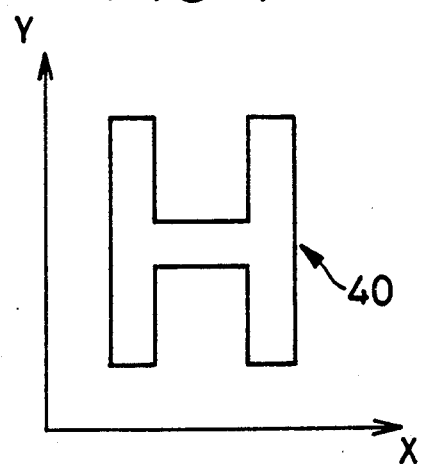
FIG. 4 is a view showing the outline of the character "H" in the 180°-turned attitude.
Figure 5:
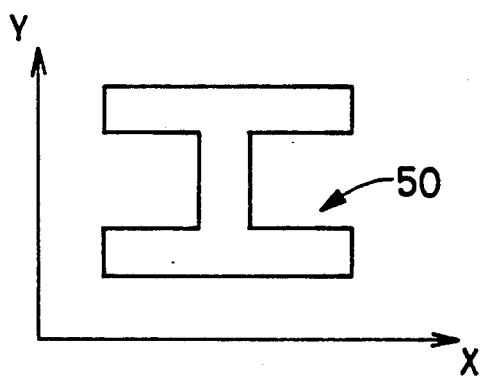
FIG. 5 is a view showing the outline of the character "H" in the 270°-turned attitude.

The determinations in steps S8 and S9 are effected based on the matrix factors "a" through "d" of the equations specifying the rotation of the character. Where the 90° rotation is effected as indicated at 30 in FIG. 3, the matrix factors "a" through "d" are as follows:

$a = 0$ $b = 1$ $c = -1$ $d = 0$

Where the 180° rotation is effected as indicated at 40 in FIG. 4, the matrix factors "a" through "d" are as follows:

$a = -1$ $b = 0$ $c = 0$ $d = -1$

Where the 270° rotation is effected as indicated at 50 in FIG. 5, the matrix factors "a" through "d" are as follows:

$a = 0$ $b = -1$ $c = 1$ $d = 0$

Therefore, if none of the above three combinations of the factors "a" through "d" is detected, an affirmative decision (YES) is obtained in step S8, indicating that the relevant stroke is free from the processing in steps S15 through S17 for correction of the reproduction width with respect to the nominal width. Further, an affirmative decision (YES) is obtained in step S9 if one of the two combinations of the factors "a" through "d" for the 90° and 270° rotations is detected. In this case, the control flow goes to step S10 to set "90°/270°" flag to "1".

Steps S7 and 10 are followed by step S11. When a negative decision (NO) is obtained in step S4 or S9, the control flow also goes to step S11. Steps S11 through S14 are executed so that the width direction data indicative of the direction of the nominal width of the relevant stroke are changed if the relevant stroke has been turned 90° or 270° as a result of the conversion of the original outline data in step S5, and so that only the horizontal stroke of the italicized character is subject to the processing in steps S15 through S17.

More specifically described, step S11 is executed to determine whether the "90°/270=" flag is set at "1" or not. If an affirmative decision (YES) is obtained in step S11, step S12 is implemented to operate the width direction data changing means 14 for changing the width direction data. Namely, the original width direction data for the originally vertical stroke 21, 22 indicate that the stroke 21, 22 has the nominal width in the x-axis direction, while the changed width direction data indicate that the horizontal stroke 31, 32 obtained from the originally vertical stroke 21, 22 by 90° or 270° rotation of the character "H" has the nominal width in the y-axis direction. Similarly, the original width data for the originally horizontal stroke 23 are changed to indicate that the vertical stroke 33 obtained from the originally horizontal stroke 23 has the nominal width in the x-axis direction.

If a negative decision (NO) is obtained in step S11, step S13 is implemented to determine whether the "ITALIC" flag is set at "1" or not. If this flag is set at "1", step S14 is implemented to determine whether the relevant stroke of the italic or italicized character "H" is a horizontal stroke or not. This step S14 is provided so that the strokes other than the horizontal strokes are not subject to the processing in steps S15 through S17. Consequently, step S14 is followed by step S18 if a negative decision (NO) is obtained in step S14. In the present example of the character "H", the originally vertical strokes 21, 22 become inclined as indicated in FIG. 6 when the character is italicized. Therefore, the italicized character "H" has only one horizontal stroke 23 which is subject to the processing in steps S15-S17. For this horizontal stroke 23 of the italicized character "H", it is not necessary to change the width direction data, since the direction of the nominal width of the stoke 23 is kept unchanged after the italicization.

It will be understood that the width direction data are changed for only the strokes whose attitude is changed from the vertical to the horizontal or vice versa by the 90° or 270° rotation of the character, and that the width direction data for the other strokes of the rotated character and the width direction data for all the strokes of the italicized character remain unchanged, that is, the original width direction data indicate that the vertical strokes have the nominal widths in the x-axis direction while the horizontal strokes have the nominal widths in the y-axis direction. It is also understood that all the strokes whose nominal widths are specified by the stroke width data stored in the memory means 13 are all subject to the processing in steps S15-17 for the reproduction width to be equal to the nominal width.

Step S15 is executed following step S12, or if negative decisions (NO) are obtained in steps S4, S11 and S13, or if an affirmative decision (YES) is obtained in step S14. In step S15, the number "d" of the picture elements on the pixel screen 71 which lie between the two outline segments defining the nominal width of the relevant stroke in the direction indicated by the width direction data is calculated based on the coordinates of the two segments included in the outline data of the character "H" and the selected character size. In the example of FIGS. 8A and 8B, the number "d" of the picture elements which lie between the two segments 82 of the stroke 81 as superposed on the pixel screen 71 is calculated based on the x-axis coordinates of the segments 82. This number "d" which represents the reproduction width of the relevant stroke is compared, in step S16, with the number "D" indicative of the nominal width specified by the stroke width data stored in the stroke width data memory means 13.

The stroke width data read in step S1 represent a difference between the coordinate values of the two outline segments defining the nominal width in the 1000×1000 coordinate system. The number "D" is calculated by dividing the difference by the value corresponding to the selected size of the picture elements, which is "50" in the present example wherein the characters are defined in the 20×20 matrix of dots. If the dividend has a decimal fraction, the dividend is rounded to the nearest whole number. The calculation of the number "D" is implemented when an affirmative decision (YES) is obtained in step S2.

If the number "d" is different from the number "D", a negative decision (NO) is obtained in step S16, and the control flow goes to step S17 in which the outline segment moving means 12 is activated to change the outline data so as to move at least one of the two segments of the outline of the relevant stroke, so that the number "d" representative of the reproduction width is equal to the number "D" representative of the nominal width.

In the present embodiment, one of the two segments is moved so as to enlarge the nominal width. The segment to be moved is nearer in the direction of the nominal width than the other segment, to the center of one of the two picture elements which are outside and next adjacent to the outline of the relevant stroke. The movement distance of this segment required to have the reproduction width ("d") equal to the nominal width ("D") is smaller than that of the other segment.

Step S17 is followed by step S18 to increment a count "n" of a stroke counter to thereby designate the next stroke of the character "H" whose nominal width is specified by the stroke width data stored in the stroke width data memory means 13. Step S18 is followed by step S19 to determine whether the current count "n" of the stroke counter is equal to "N" which is the number of the strokes of the character "H" whose nominal widths are specified by the stored stroke width data. If a negative decision (NO) is obtained, the control flow goes back to step S11 and execute the subsequent steps for correcting the reproduction width of the next stroke, if necessary. Steps S11-S19 are repeatedly executed until an affirmative decision (YES) is obtained in step S19. When the current count "n" becomes equal to "N", the control flow goes to step S3 in which the outline data (which have been or have not been converted in step S5, and which have been or have not been changed in step S17) are converted into the corresponding dot data.

If an affirmative decision (YES) is obtained in step S16, that is, if the number "d" representative of the reproduction width of the relevant stroke is equal to the number "D" representative of the nominal width, the control flow goes to step S18, skipping step S17. In this case, therefore, the segments of the outline defining the nominal width of the stroke are not moved.

It will be understood from the foregoing description that the present data converting apparatus is characterized by the width direction data changing means 14 which is adapted to implement steps S6 through S14. If steps S6-S14 are not provided, the outline data of the character "H" which have been converted for 90° or 270° rotation of the character are not properly changed in steps S15-S17 for correction of the reproduction widths of the horizontal strokes 31, 32 and vertical stroke 33 which are originally the vertical strokes 21, 22 and horizontal stroke 23, respectively. Thus, the width direction data changing means 14 permits the reproduction widths of the stokes to be equal to the nominal widths, even when the attitude of the strokes are changed from the vertical to the horizontal, or vice versa.

Further, steps S6, S7, S13 and S14 are provided to implement steps S15-S17 for only the horizontal stroke of the italicized character 60. For the inclined strokes of the italicized character 60, steps S15-S17 are not executed.

While the present invention has been described in its presently preferred embodiment, it is to be understood that the invention is not limited to the details of the illustrated embodiment, but may be embodied with various changes, modifications and improvements, which may occur to those skilled in the art.

In the illustrated embodiment, the number "D" representative of the nominal width of a stroke of a character is calculated immediately after an affirmative decision (YES) is obtained in step S2. However, it is possible to calculate the number "D" before step S1, based on the selected character size (size of the picture elements on the pixel screen), and the coordinate values of the two outline segments defining the nominal width of each stroke of the character in the 1000×1000 coordinate system, after the character size is specified. In this case, the number "D" stored in the stroke width data memory means 13 is read in step S1 as the stroke width data.

The stroke width data may include coordinate data defining the outline of each stroke of the character, and width data representative of the numbers of the picture elements representative of the nominal width, which numbers correspond to different character sizes.

In the illustrated embodiment, the outline segment moving means 12 is adapted to move one of the two segments of the outline defining the nominal width of a stroke, which one segment is nearer in the width direction than the other segment, to one of the center of the two picture elements which are outside and next adjacent to the outline of the stroke. However, one of the two segments which is to be moved by the moving means 12 may be fixed. That is, the moving means 12 may be adapted to move the segment on a predetermined one of opposite sides of the center of the stroke parallel to the stroke outline segments. For instance, where the x-axis or y-axis coordinate value of the relevant stroke is the smallest or largest of all the strokes of the character, one of the two stroke outline segments which is located inwardly of the other segment is always moved by the outline segment moving means 12.

It is also possible to move both of the two segments of the stroke outline, where the difference between the reproduction and nominal widths of a stroke corresponds to two or more picture elements on the pixel screen. Further, the two segments may be moved together in the same direction parallel to the direction of the width of the stroke, if the simultaneous movement of the two segments without enlarging the nominal width results in increasing the reproduction width to the nominal width.

What is claimed is:

1. A data converting apparatus for converting a batch of outline data representative of an outline of a character having strokes, into a batch of dot data which include dot-forming bits each indicative of the presence of an image dot to be formed at a position of a corresponding dot-forming picture element which lies within the outline of each of said at least one stroke so as to satisfy a predetermined requirement, when said outline of said character is superimposed on a coordinated pixel screen wherein picture elements are defined by a plurality of parallel x-axis pixel lines and a plurality of y-axis pixel lines perpendicular to said x-axis pixel lines, wherein the improvement comprises:

stroke width data memory means for storing stroke width data which designate at least one of said strokes of said character and specify a nominal width of each of said at least one of the strokes, and width direction data indicative of a direction of said nominal width of said each stroke, said nominal width specifying the width of said each stroke which is defined by two segments of the outline of said each stroke;

width direction data changing means for said width direction data if said outline data of said character are subjected to a conversion for one of rotation and italicization of the character as represented by the converted outline data, said width direction data being changed depending upon a condition of said conversion; and outline segment moving means for changing said converted outline data so as to move, in a direction indicated by the changed width direction data, at least one of said two segments of the outline of said each stroke, on said coordinated pixel screen, before said converted outline data are converted into said dot data, if the number of the picture elements which lie between said two segments in the direction indicated by said changed width direction data so as to satisfy said predetermined requirement is different from the number of the picture elements which correspond to said nominal width of said each stroke, a distance of movement of said at least one of said two segments being determined so that the number of the picture elements which lie between said two segments is equal to the number of the picture elements corresponding to said nominal width.

2. A data converting apparatus according to claim 1, further comprising means for effecting said conversion of said outline data for one of said rotation and italicization of said character, according to the following equations, $$X1 = aX + bY$$

$$Y1 = cX + dY$$

where, X and Y are x-axis and y-axis coordinate values, respectively, on said pixel screen, of each point defining the outline of said character as represented by said outline data, X1 and Y1 are x-axis and y-axis coordinate values, respectively, on said pixel screen, of each point defining the outline of the character as represented by said converted outline data, and a, b, c and d are conversion matrix factors, and wherein said width direction data changing means includes conversion identifying means for determining said condition of said conversion of said outline data, based on said conversion matrix factors a, b, c and d.

3. A data converting apparatus according to claim 2, wherein said width direction data changing means further includes memory means for storing conversion identifying data indicative of said condition of said conversion.

4. A data converting apparatus according to claim 3, wherein said width direction data changing means further includes judging means, for determining based on said conversion identifying data, whether it is necessary to activate said outline segment moving means to move said at least one of said two segments before said converted outline data are converted into said dot data.

5. A data converting apparatus according to claim 1, wherein said width direction data changing means comprises judging means for determining whether it is necessary to activate said outline segment moving means to move said at least one of said two segments before said converted outline data are converted into said dot data.

6. A data converting apparatus according to claim 5, further comprising means for effecting said conversion of said outline data for one of said rotation and italicization of said character, according to the following equations, $$X1 = aX + bY$$

$$Y1 = cX + dY$$

where, X and Y are x-axis and y-axis coordinate values, respectively, on said pixel screen, of each point defining the outline of said character as represented by said outline data, X1 and Y1 are x-axis and y-axis coordinate values, respectively, on said pixel screen, of each point defining the outline of the character as represented by said converted outline data, and a, b, c and d are conversion matrix factors, and wherein said judging means is operated based on said conversion matrix factors a, b, c and d, to determine whether it is necessary to activate said outline segment moving means.

7. A data converting apparatus according to claim 5, wherein said stroke width data indicate said nominal width of said each of said at least one stroke, in at least one of x-axis and y-axis directions parallel to said x-axis and y-axis pixel lines, and said judging means changes said width direction data indicative of said at least one of said x-axis and y-axis directions to width direction data indicative of the other of said x-axis and y-axis directions if said conversion of said outline data for rotation of said character causes one of 90° rotation and 270° rotation of said character.

8. A data converting apparatus according to claim 5, wherein said conversion of said outline data for italicization of said character causes a displacement of said character in an x-axis direction parallel to said x-axis pixel lines, by a distance which continuously varies in a y-axis direction parallel to said y-axis pixel lines, said judging means determining that it is not necessary to activate said outline segment moving means, for each of the strokes of the italicized character which have the nominal width in the x-axis direction, and determining that it is necessary to activate said outline segment moving means, for each of the strokes of said italicized character which have the nominal width in the y-axis direction.

9. A data converting apparatus according to claim 1, further comprising stroke width determining means for preparing said stroke width data such that said nominal width of said each of said at least one stroke of the character is represented by the number of said picture elements which is obtained by dividing a distance between said two segments of the outline of said each stroke, by a size of said picture elements.

10. A data converting apparatus according to claim 1, wherein said outline segment moving means moves, in the direction indicated by said changed width direction data, one of said two segments of the outline of said each stroke which is nearer in said direction than the other segment, to one of the two pixel lines which are outside and next adjacent to said outline of said each stroke in said direction.

11. A data converting apparatus according to claim 1, wherein said outline segment moving means moves, in the direction indicated by said changed width direction data, one of said two segments of the outline of said each stroke which is on a predetermined one of opposite sides of a centerline of said each stroke parallel to said two segments.

12. A data converting apparatus according to claim 1, wherein said outline segment moving means moves, in the direction indicated by said changed width direction data, both of said two segments of the outline of said each stroke.

* * * * *